(12) United States Patent
Levitan

(10) Patent No.: US 8,370,671 B2
(45) Date of Patent: Feb. 5, 2013

(54) SAVING POWER BY POWERING DOWN AN INSTRUCTION FETCH ARRAY BASED ON CAPACITY HISTORY OF INSTRUCTION BUFFER

(75) Inventor: David S. Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/629,435

(22) Filed: Dec. 2, 2009

(65) Prior Publication Data

US 2011/0131438 A1    Jun. 2, 2011

(51) Int. Cl.
*G06F 1/00* (2006.01)
*G06F 1/32* (2006.01)

(52) U.S. Cl. ......................................... 713/324; 713/320

(58) Field of Classification Search .................. 713/300, 713/320, 324
See application file for complete search history.

(56) References Cited

U.S. PATENT DOCUMENTS

| | | | | |
|---|---|---|---|---|
| 5,493,648 A * | 2/1996 | Murray et al. | ................. | 345/537 |
| 5,742,781 A * | 4/1998 | Bajwa | ............................ | 712/208 |
| 5,781,783 A * | 7/1998 | Gunther et al. | ............... | 713/320 |
| 5,978,841 A * | 11/1999 | Berger | ........................... | 709/217 |
| 6,029,228 A * | 2/2000 | Cai et al. | ....................... | 711/137 |
| 6,240,508 B1 * | 5/2001 | Brown et al. | .................. | 712/219 |
| 6,779,122 B2 * | 8/2004 | George et al. | ................. | 713/330 |
| 7,203,198 B2 * | 4/2007 | Knight et al. | ............. | 370/395.54 |
| 7,310,722 B2 * | 12/2007 | Moy et al. | ..................... | 712/207 |
| 7,506,079 B2 * | 3/2009 | Sugimoto | ........................ | 710/21 |
| 2006/0155933 A1 | 7/2006 | Buyuktosunoglu et al. | | |
| 2006/0174148 A1 * | 8/2006 | Yang | .............................. | 713/322 |
| 2006/0206692 A1 | 9/2006 | Jensen | | |
| 2006/0277397 A1 * | 12/2006 | Sartorius et al. | .............. | 712/240 |
| 2008/0010443 A1 | 1/2008 | Homewood et al. | | |
| 2008/0229068 A1 * | 9/2008 | Bose et al. | ..................... | 712/205 |
| 2009/0049320 A1 * | 2/2009 | Dawkins et al. | .............. | 713/324 |

FOREIGN PATENT DOCUMENTS

EP    0 992 894 A1    4/2000

* cited by examiner

*Primary Examiner* — Thomas Lee
*Assistant Examiner* — Phil Nguyen
(74) *Attorney, Agent, or Firm* — Stephen J. Walder, Jr.; Matthew B. Talpis

(57) ABSTRACT

Mechanisms for saving power by powering down an instruction fetch array based on capacity history information of an instruction buffer are provided. The mechanisms operate to receive a current access to an instruction buffer of a processor. The current access is a fetch of a group of one or more instructions to be stored in the instruction buffer. A determination is made, for one or more prior accesses occurring prior to the current access, if a predetermined pattern of capacity availability of the instruction buffer indicates that the instruction buffer is likely to have available capacity to store the group of one or more instructions of the current access. An instruction fetch unit array is powered down in response to a determination that the instruction buffer is not likely to have available capacity to store the group of one or more instructions of the current access.

24 Claims, 6 Drawing Sheets

|      | CYC 0 | CYC 1 | CYC 2 | CYC 3 | CYC 4 | CYC 5 | CYC 6 | CYC 7 | CYC 8 | CYC 9 |
|------|-------|-------|-------|-------|-------|-------|-------|-------|-------|-------|
| IFM1 | A     |       |       |       |       |       |       |       |       |       |
| IF0  |       | A     |       |       |       |       |       |       |       |       |
| IF1  |       |       | A     |       |       |       |       |       |       |       |
| IF2  |       |       |       | A     |       |       |       |       |       |       |
| PTR  | 0     | 5     | 5     | 5     | 0     |       |       |       |       |       |

*FIG. 5A*

|      | CYC 0 | CYC 1 | CYC 2 | CYC 3 | CYC 4 | CYC 5 | CYC 6 | CYC 7 | CYC 8 | CYC 9 |
|------|-------|-------|-------|-------|-------|-------|-------|-------|-------|-------|
| IFM1 | A     |       | B     |       |       |       |       |       |       |       |
| IF0  |       | A     |       | B     |       |       |       |       |       |       |
| IF1  |       |       | A     |       | B     |       |       |       |       |       |
| IF2  |       |       |       | A     |       | B     |       |       |       |       |
| PTR  | 0     | 5     | 4     | 4     | 5     | 5     | 0     |       |       |       |

*FIG. 5B*

|      | CYC 0 | CYC 1 | CYC 2 | CYC 3 | CYC 4 | CYC 5 | CYC 6 | CYC 7 | CYC 8 | CYC 9 |
|------|-------|-------|-------|-------|-------|-------|-------|-------|-------|-------|
| IFM1 | A     | B     | C     | D     | E     | F     | G     | H     | I     |       |
| IF0  |       | A     | B     | C     | D     | E     | F     | G     | H     | I     |
| IF1  |       |       | A     | B     | C     | D     | E     | F     | G     | H     |
| IF2  |       |       |       | A     | B     | C     | D     | E     | F     | G     |
| PTR  | 0     | 5     | 4     | 3     | 3     | 3     | 3     | 3     | 3     | 4     |

*FIG. 5C*

SAVING POWER BY POWERING DOWN AN INSTRUCTION FETCH ARRAY BASED ON CAPACITY HISTORY OF INSTRUCTION BUFFER

BACKGROUND

The present application relates generally to an improved data processing apparatus and method and more specifically to mechanisms for saving power by powering down an instruction fetch array based on a capacity history of the instruction buffer.

In a processor architecture, the instruction fetch unit is responsible for fetching instructions from an instruction cache for execution by execution units of the processor. The instruction fetch unit includes an instruction buffer which stores the fetched instructions before they can be sent to an instruction decode unit for subsequent decoding, scheduling, and execution. The instruction buffer is a critical resource in the processor architecture in that when the instruction buffer becomes full, instruction fetching is stalled.

In some processor architectures, when such a stall occurs, the instruction fetch unit's arrays are still powered up but there is no additional useful work being obtained from these arrays since instruction fetching is stalled awaiting a drain of instructions from the instruction buffer. Unfortunately, with known processor architectures, there is no ability to know early enough in the fetch sequence whether there will be room in the instruction buffer or not when the instructions arrive at the instruction buffer. This may lead to a bubble in the dispatch pipeline due to the processor not accessing the instruction fetch unit arrays because there was no room in the instruction buffer, but there actually being room in the instruction buffer when the instructions were available from the instruction fetch unit arrays. This causes a significant performance loss.

As a result, known processor architectures simply always keep the instruction fetch unit arrays powered up almost all of the time that the processor is operating. The only times where the instruction fetch unit arrays may be powered down is when there is an instruction cache miss or an effective to real address table (erat) miss pending.

SUMMARY

In one illustrative embodiment, a method, in a data processing system, is provided for saving power by powering down an instruction fetch array based on capacity history information of an instruction buffer are provided. The method operates to receive a current access to an instruction buffer of a processor. The current access is a fetch of a group of one or more instructions to be stored in the instruction buffer. A determination is made, for one or more prior accesses occurring prior to the current access, if a predetermined pattern of capacity availability of the instruction buffer indicates that the instruction buffer is likely to have available capacity to store the group of one or more instructions of the current access. An instruction fetch unit array is powered down in response to a determination that the instruction buffer is not likely to have available capacity to store the group of one or more instructions of the current access.

In other illustrative embodiments, a system/apparatus is provided. The system/apparatus may comprise logic for performing the various operations of the method. The apparatus may be part of a processor or other integrated circuit device.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A-5C are example diagrams illustrating cycle-by-cycle operations of the circuitry of FIG. 4 in accordance with one illustrative embodiment.

DETAILED DESCRIPTION

Figure 1:
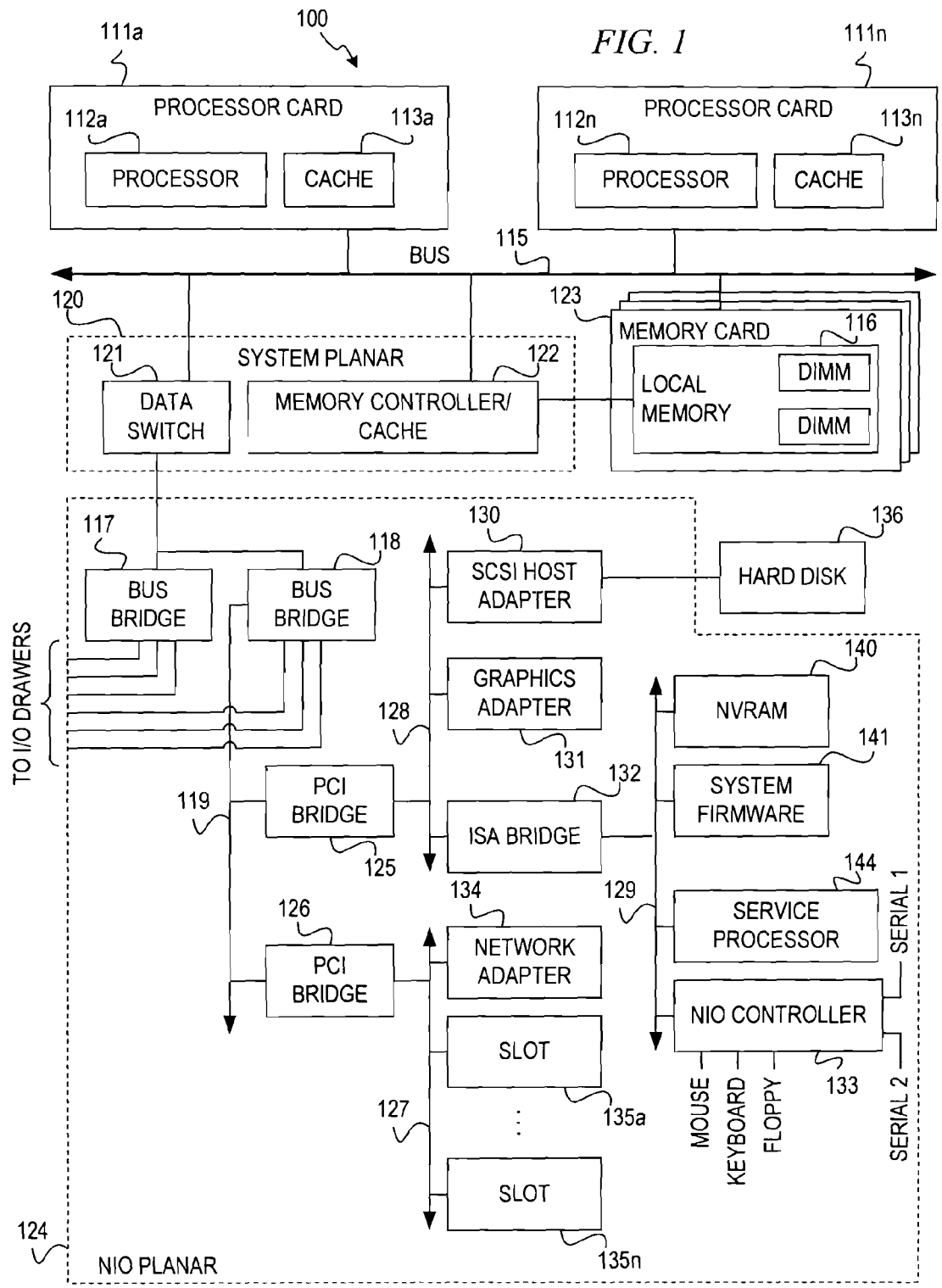
FIG. 1 is a block diagram of a data processing system in which aspects of the illustrative embodiments may advantageously be implemented and utilized.

The illustrative embodiments provide a mechanism for saving power by powering down an instruction fetch array, e.g., an instruction cache, branch history table (BHT) array, count cache, etc., based on a capacity history of the instruction buffer. The mechanisms of the illustrative embodiments are implemented based on the observation that there are patterns of activity that exist which would allow powering down of the instruction fetch unit arrays to achieve greater power savings. In accordance with the mechanisms of the illustrative embodiments, for each access, e.g., a fetch of a group of instructions, to an instruction buffer, the capacity of the instruction buffer at the time of the access is determined, i.e. whether or not there was available space in the instruction buffer at the time of the access. In one illustrative embodiment, the group of instructions comprises 1 to 8 sequential instructions depending on the starting address, e.g., if the last 3 bits of the address are 000 then the group comprises 8 instructions, if the last 3 bits of the address are 001 the group comprises 7 instructions, and if the last 3 bits are 111 the group comprises 1 instruction.

This information is maintained for up to n accesses in the past, e.g., if n=6, then the capacity history information for the instruction buffer is maintained for up to 6 previous accesses of the instruction buffer. If there was no room in the instruction buffer n accesses in the past, then the instruction fetch unit arrays are powered down to conserve power. If there was room in the instruction buffer n accesses in the past, then the instruction fetch unit arrays are powered up or are allowed to remain in a powered-up state.

Moreover, to minimize performance losses from back-to-back instruction fetch unit (IFU) array power down operations, the illustrative embodiments provide mechanisms for preventing such back-to-back IFU array power down operations. In some illustrative embodiments, these mechanisms may allow back-to-back power down operations, i.e. power down operations in two consecutive cycles, but prevents a third consecutive power down operation from occurring. Depending upon the system's particular tolerance for performance loss, this can be extended to allow any number X consecutive power down operations while preventing further X+1 consecutive power down operations. Moreover, the illustrative embodiments are not limited to the above and encompass any other type of state machine that detects a pattern of accesses such that it can be determined that it is likely that there will be room in the instruction buffer when the instructions arrive. Moreover, the mechanisms of the illustrative embodiments are not limited to use with instruction buffers and instruction fetching but may be used in other portions of the processor architecture.

Furthermore, the illustrative embodiments provide mechanisms for clearing the capacity history information in the event of a flush or cache miss occurring. In this way, the IFU arrays will be powered up for the next n accesses to allow re-fetching of instructions. That is, in the case of a flush or cache miss, the instruction buffers will normally be empty and by powering up the IFU arrays in response to detecting such a flush or cache miss event, the performance of the processor is not negatively impacted by a powered down IFU array when it is known that there should be room in the instruction buffer to receive the newly fetched instructions.

Thus, the mechanisms of the illustrative embodiments take advantage of the observation that there is often a pattern where the instruction buffer is full every so many cycles, e.g., every other cycle, or in some cases, every third cycle, such that power can be saved without any loss of performance. That is, if the instruction fetch unit would be stalled anyway because the instruction buffer is full and must wait for instructions to be drained from the instruction buffer before fetching more instructions, then the processor can power down the instruction fetch unit arrays to conserve the power that is being used to keep the arrays active even though they are not being used to fetch additional instructions. Thus, power may be saved without loss of processor performance. Additionally, if the consumption rate of the instruction buffers is generally slower than the ability of the instruction fetch unit to fetch instructions, then the mechanisms of the illustrative embodiments tend to meter the instruction fetching so that power savings is made possible with only a relatively small performance loss.

The illustrative embodiments may be utilized in many different types of processors and data processing environments having various architectures. The flowchart and block diagrams in the figures described hereafter illustrate the architecture, functionality, and operation of possible implementations of systems and methods according to various embodiments of the present invention. It should be noted that, in some alternative implementations, the functions noted in the blocks of the figures may occur out of the order noted in the figures. For example, two blocks shown in succession may, in fact, be performed or operate substantially concurrently, or the blocks may sometimes be performed or operate in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts.

Figure 2:
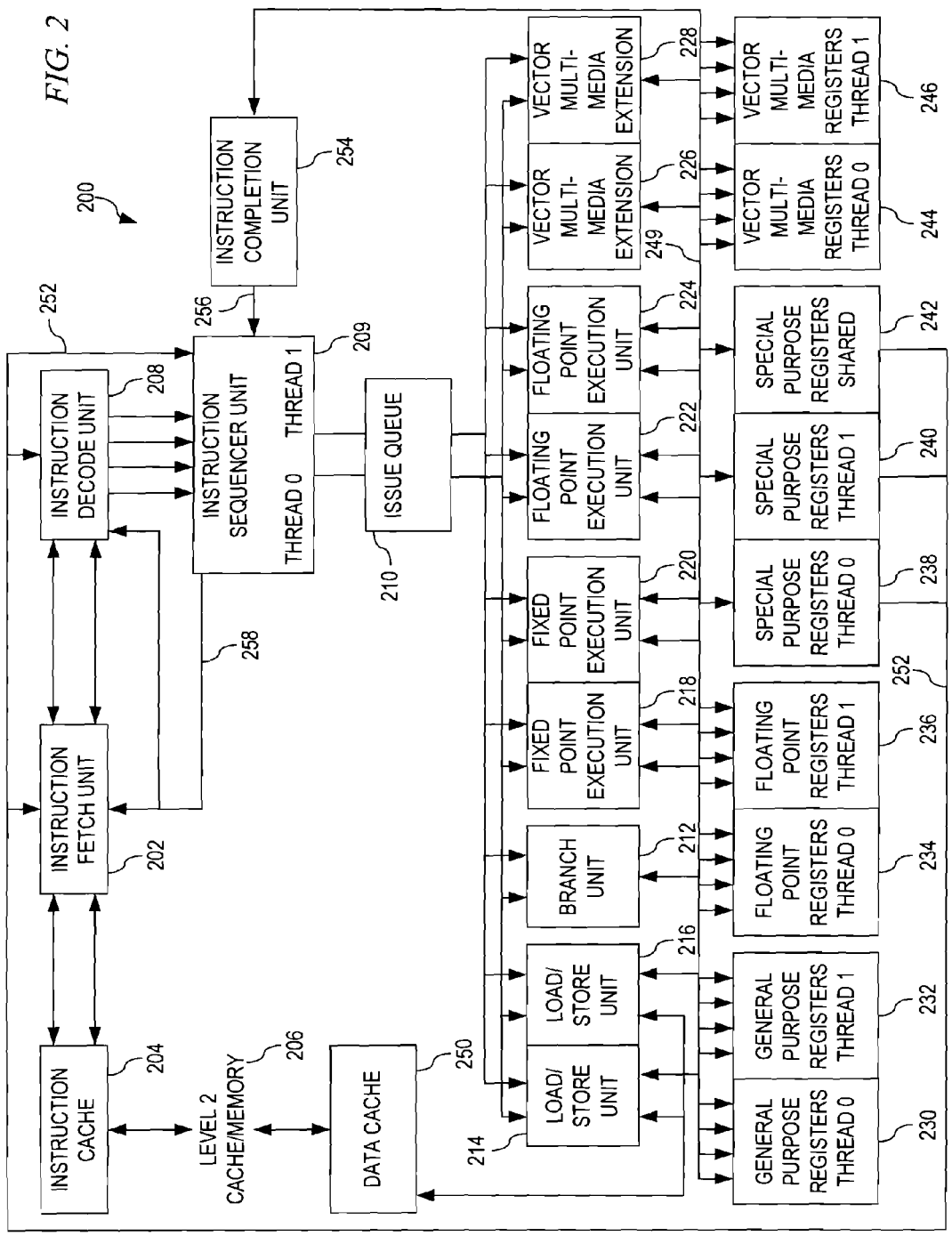
FIG. 2 is an example block diagram of a conventional dual threaded processor design showing functional units and registers is depicted in accordance with an illustrative embodiment.

In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to state or imply any limitation with regard to the types of processor architectures and data processing environments in which the mechanisms of the illustrative embodiments may be implemented.

Referring now to the drawings, and in particular to FIG. 1, there is depicted a block diagram of a data processing system in which aspects of the illustrative embodiments may advantageously be implemented and utilized. As shown, data processing system 100 includes processor cards 111$a$-111$n$. Each of processor cards 111$a$-111$n$ includes a processor and a cache memory. For example, processor card 111$a$ contains processor 112$a$ and cache memory 113$a$, and processor card 111$n$ contains processor 112$n$ and cache memory 113$n$.

Processor cards 111$a$-111$n$ are connected to main bus 115. Main bus 115 supports a system planar 120 that contains processor cards 111$a$-111$n$ and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135$a$-135$n$ via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Referring to FIG. 2, an example block diagram of a conventional dual threaded processor design showing functional units and registers is depicted in accordance with an illustrative embodiment. Processor 200 may be implemented as one of processors 112a, . . . , 112n in FIG. 1, for example. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques. It should be noted that while a dual-thread SMT architecture is shown, the illustrative embodiments are not limited to such and other types of architectures, including SMT architectures supporting more than two simultaneous threads, may be used with the mechanisms of the illustrative embodiments without departing from the spirit and scope of the illustrative embodiments.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

In accordance with the illustrative embodiments, the instruction fetch unit (IFU), such as IFU 202 in FIG. 2, of the processor comprises various logic for implementing aspects of the illustrative embodiments. In particular, the IFU comprises, for each thread supported by the processor architecture, an instruction buffer and logic for maintaining a capacity history of the instruction buffer. Moreover the IFU comprises logic for determining whether to place the IFU arrays in a power down state or powered up state based on the history of whether the instruction buffer had available capacity n accesses ago.

Moreover, the IFU comprises logic to minimize performance losses from consecutive instruction fetch unit (IFU) array power down operations. Furthermore, the IFU provides logic for clearing the capacity history information in the event of a flush or cache miss occurring.

Figure 3:
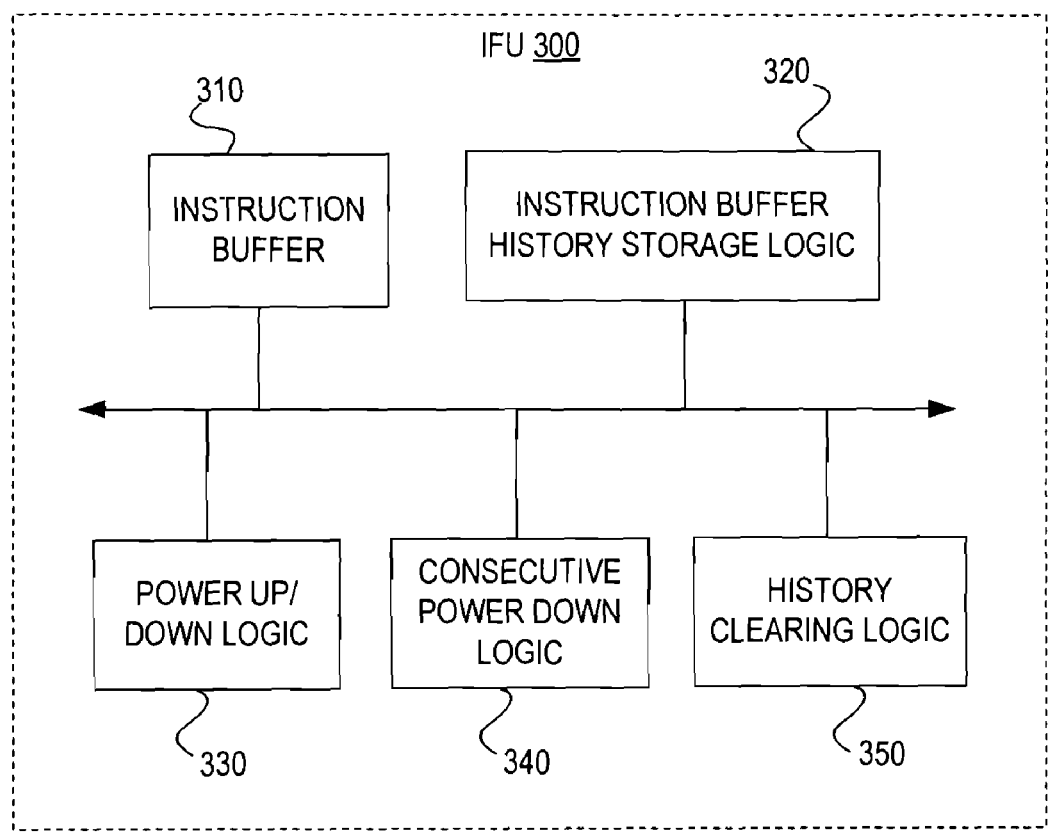
FIG. 3 is an example block diagram of example logic in the IFU of a processor for implementing various aspects of the illustrative embodiments.

FIG. 3 is an example block diagram of example logic in the IFU of a processor for implementing various aspects of the illustrative embodiments. As shown in FIG. 3, the IFU 300 comprises an instruction buffer 310, instruction buffer history storage logic 320, power up/down logic 330, consecutive power down logic 340, and history clearing logic 350. The various logic elements 310-350 are implemented as circuitry within the IFU 300.

The logic elements 310-350 operate to save power by powering down an instruction fetch array, e.g., an instruction cache, branch history table (BHT) array, count cache, etc., based on capacity history information of the instruction buffer 310 as maintained in the instruction buffer history storage logic 320. For purposes of clarity of the present invention, the description hereafter will focus on the operation of a single instance of the logic elements 310-350 for a single thread. It should be appreciated that the operation and logic as described herein may be replicated for each thread supported by the processor architecture.

In accordance with the mechanisms of the illustrative embodiments, for each access to the instruction buffer 310, the capacity of the instruction buffer 310 at the time of the access is determined, i.e. whether or not there was available space in the instruction buffer 310 at the time of the access. This information is maintained for up to n accesses in the past in the instruction buffer history storage logic 320, e.g., if n=6, then the capacity history information for the instruction buffer 310 is maintained in the instruction buffer history storage logic 320 for up to 6 previous accesses of the instruction buffer 310. If there was no room in the instruction buffer 310 n accesses in the past, then an appropriate output is generated by the power up/down logic 330 to power down the IFU arrays 360 to conserve power. If there was room in the instruction buffer 310 n accesses in the past, then the power up/down logic 330 generates an appropriate output to power up the IFU arrays 360 or maintain the IFU arrays 360 in a powered-up state. For example, this output may be an output signal sent to the IFU arrays 360 in an early instruction fetch minus 1 (ifm1) cycle that causes the array clocks to be turned on/off.

The consecutive power down logic 340 operates to minimize performance losses from consecutive, e.g., back-to-back, IFU array power down operations by the power up/down logic 330. The consecutive power down logic 340 interfaces with the power up/down logic 330 to override power down outputs by the power up/down logic 330 in cases where consecutive power down operations would occur. In some illustrative embodiments, the consecutive power down logic 340 may allow back-to-back power down operations, i.e. power down operations in two consecutive cycles, but prevents a third consecutive power down operation from occurring. Depending upon the system's particular tolerance for performance loss, this can be extended to allow any number X consecutive power down operations while preventing further X+1 consecutive power down operations.

The history clearing logic 350 operates to clear the capacity history information stored in the instruction buffer history storage logic 320 when events occur where a clearing of the history is appropriate. Such events may be events where it is known that the instruction buffer 310 will have available capacity for storing instructions following the event. Examples of such events include a flush of the processor pipeline, a cache miss occurring, or the like. When one of these events occurs, and the history clearing logic 350 is notified of the occurrence of the event from the appropriate logic unit in the processor, the instruction buffer history storage logic 320 is cleared. In this way, the IFU arrays 360 will be powered up for the next n accesses to allow re-fetching of instructions or fetching of new instructions. For example, in the case of a flush or cache miss, the instruction buffer 310 will normally be empty, and by powering up the IFU arrays 360 in response to detecting such a flush or cache miss event, the performance of the processor is not negatively impacted by a powered down IFU arrays 360 when it is known that there should be room in the instruction buffer 310 to receive the newly fetched instructions.

Figure 4:
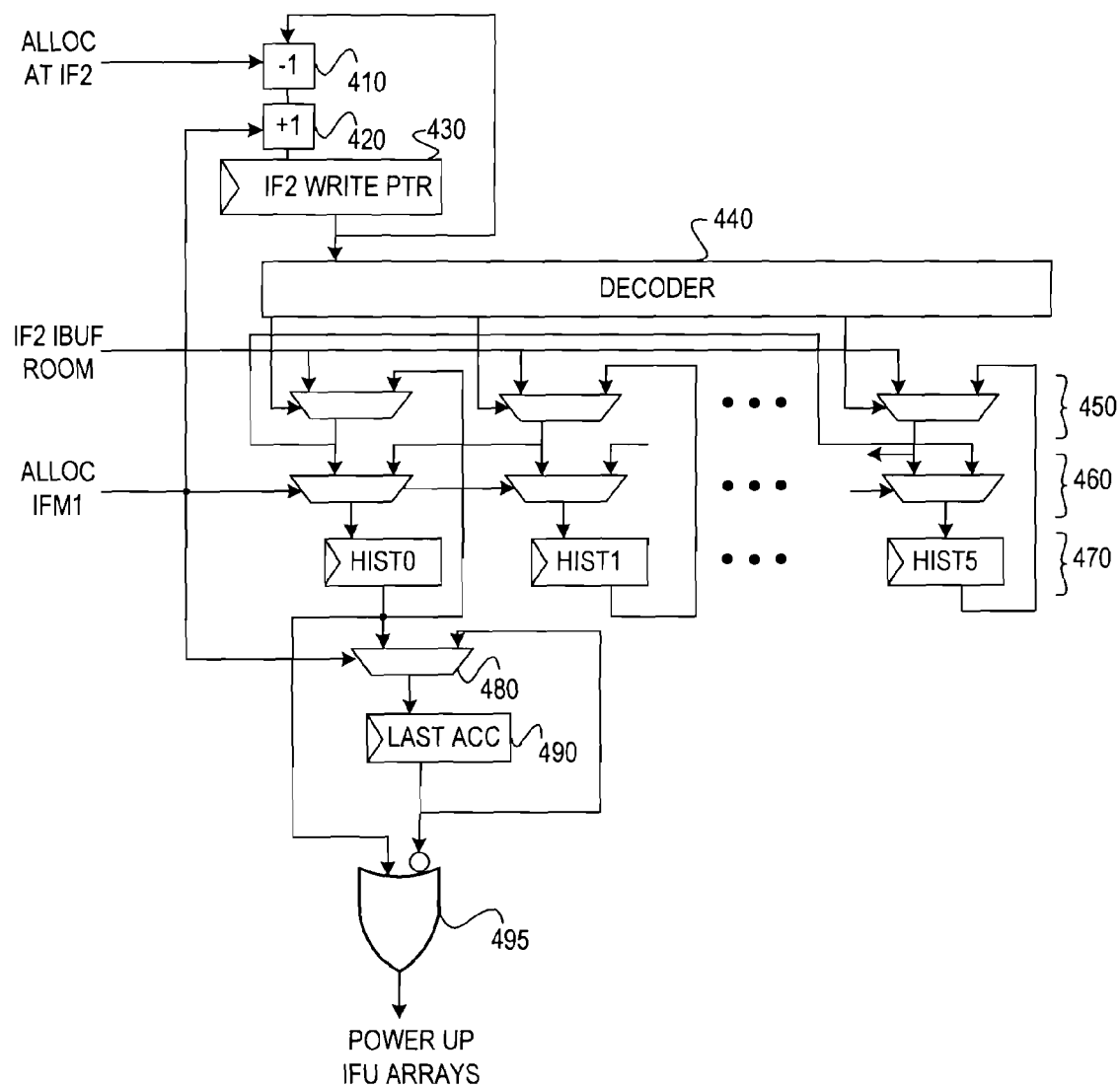
FIG. 4 is an example circuit diagram of logic of an IFU for performing a power up/down operation based on instruction buffer capacity history information in accordance with one illustrative embodiment.

FIG. 4 is an example circuit diagram of logic of an IFU for performing a power up/down operation based on instruction buffer capacity history information in accordance with one illustrative embodiment. Again, it should be appreciated that the depicted circuitry is provided for a single thread supported by the processor architecture. If the processor architecture supports more than one simultaneous thread of execution, there may be multiple copies of this circuitry, one for each supported thread.

In the example circuitry shown in FIG. 4, it should be considered that, with regard to an instruction fetch pipeline for placing an instruction in the instruction buffer of the IFU, there are 4 stages, i.e. ifm1, if0, if1, and if2. The instruction fetch address buffer (ifar) for a fetched instruction is allocated at the instruction fetch minus 1 stage (ifm1) and the result of a determination as to whether there is capacity in the instruction buffer for the fetched instruction is obtained at the if2 stage. The ifar buffer addresses the IFU arrays and instructions are placed in the instruction buffer at stage if2 if there is available capacity.

The basic concept in the depicted circuit is that the history bit 0, stored in history register 0, always indicates the history result that should be used at the ifm1 stage to determine whether to power up or power down the IFU arrays. That is, the value stored in the history bit 0 is used whenever there is an ifm1 allocation of an ifar to determine if n accesses ago there was available capacity in the instruction buffer. If so, then the IFU array is powered up or remains powered up. If there was not available capacity, then the IFU arrays are powered-down to conserve power. In addition, the last access register stores an indicator as to whether a last access of the instruction buffer caused a power-up or power-down condition so that consecutive power downs are avoided.

With reference now to the specific elements shown in FIG. 4, as shown in FIG. 4 the circuitry comprises a decrementer 410, an incrementer 420, an if2 write pointer 430, a decoder 440, a first set of multiplexers 450, a second set of multiplexers 460, a set of n history registers 470, a multiplexer 480 coupled to history register 0, a last access register 490, and an OR gate 495. The decrementer 410 and incrementer 420 are coupled to the if2 write pointer register 430 which identifies which history register 470 to write to with regard to whether or not there was capacity in the instruction buffer or not. The decrementer 410 and incrementer 420 operate to increment/decrement the if2 write pointer so that it points to an appropriate one of the history registers 470. The decrementer 410 operates whenever there is an allocation at the if2 stage, i.e. there was sufficient capacity in the instruction buffer to perform the access operation, e.g., the write of the instruction address to an instruction fetch address register (ifar) of the instruction buffer, as denoted by the input "alloc at if2". The incrementer 420 operates each time there is an allocation of an ifar at the ifm1 stage, as denoted by the input "alloc ifm1." The increments and decrements performed by these elements are modulo n since there are only a limited number n of history registers 470, i.e. the decrementer 410 decrements from 0 to n-1 and the incrementer 420 increments from n-1 to 0. In one illustrative embodiment, n=6 and thus, there are 6 history registers 470, the decrementer 410 decrements from 0 to 5, and the incrementer 420 increments from 5 to 0, e.g., the incrementer goes through the following states 0→1→2→3→4→5→0 and the decrementer goes from 0→5→4→3→2-→1→0, etc.

The if2 write pointer register 430 provides an output to the decoder 440 which also receives the "alloc at if2" input. The "alloc at if2" input causes the decoder 440 to use the if2 write pointer 430 to output select signals to the first set of multiplexers 450. The select signal from the decoder 440 identifies which input to each multiplexer in the first set of multiplexers 450 to select for output. The choice is between the "if2 ibuf room" input signal, which identifies whether or not there is room, i.e. available capacity, in the instruction buffer at the current if2 stage of the IFU pipeline, or a feedback input signal from the corresponding history register in the set of history registers 460, i.e. the previous setting for the history register. Using this configuration, the multiplexer in the first set of multiplexers 450 that corresponds to the history register pointed to by the if2 write pointer 430 receives a select signal that causes the value of "if2 ibuf room" input signal to be stored in the history register while the other multiplexers in the first set of multiplexers 450 receive select signals to select the feedback from the history register thereby maintaining the previously stored value in the history register.

The output from the first set of multiplexers 450 are fed as inputs to the second set of multiplexers 460 which operate to perform a shift left operation on the values stored in the history registers 470 with each allocation at the ifm1 stage of the IFU pipeline. As shown in FIG. 4, the "alloc ifm1" input signal is provided as an input to each of the multiplexers in the second set of multiplexers 460 as a select signal. When an allocation is performed at the ifm 1 stage of the IFU pipeline, the multiplexers in the second set of multiplexers 460 select the input from the multiplexer in the first set of multiplexers 450 corresponding to a history register to the right, thereby causing a left shift operation to occur. Otherwise, the output from the multiplexer in the first set of multiplexers 450 corresponding to the multiplexer in the second set of multiplexers 460 is selected thereby storing either the previously stored value in the history register or a new value corresponding to the "if2 ibuf room" input signal, depending upon the selected input of the multiplexer in the first set of multiplexers 460.

The history registers 470 store values indicative of whether or not the instruction buffer had available room for the allocation of an instruction fetch address register for a new instruction during a previous access operation, up to n accesses ago (in the depicted example, n=6 such that there are history registers 0 to 5). The history registers 470 output their stored values in a feedback manner to their corresponding multiplexers in the first set of multiplexers 450. The first history register, e.g., history register 0 (hist0) also outputs its stored value to both a multiplexer 480 and a logic gate 495, which in the depicted example is an OR gate.

The multiplexer 480 receives the output from the hist0 register and a feedback input value from the last access register 490 as inputs. The multiplexer 480 further receives the "alloc ifm1" input signal as a select signal. When the "alloc ifm1" input signal is asserted, the multiplexer 480 selects the output from the hist0 register as the output of the multiplexer 480 to the last access register 490. Otherwise, the multiplexer 480 outputs the inverted previously stored last access value from the last access register 490 in order to power-up the IFU arrays if they were not powered up on a last access.

The last access register 490 stores a value indicative of whether, for a last access, the output of the hist0 value caused a power down operation or not. That is, with the logic gate 495, if either the output from the hist0 register indicates no room in the instruction buffer n accesses ago, or the last access register 490 indicates that a last access did not result in a power down of the IFU arrays, then the logic gate 495 will either assert a signal to power down the IFU arrays or not assert a signal to power up the IFU arrays. If either the output from the hist0 register indicates there was room in the instruction buffer n accesses ago, or the last access register 490 indicates that a last access did result in a power down of the IFU arrays, then the logic gate 495 will either assert a signal to power up the IFU arrays or will not assert a signal to power down the IFU arrays.

It should be further noted that, while not shown in FIG. 4 in order to avoid over cluttering the diagram, inputs may be provided to each of the history registers 470, the if2 write pointer register 430, and the last access register 490 to reset the values stored in these registers in response to the occurrence of certain events. For example, inputs may be provided in response to a flush or a cache miss to thereby reset these registers to default values indicative of the instruction buffer being empty and available for allocation of instruction fetch address registers. These inputs may be provided, for example, from the instruction completion unit 254 in FIG. 2. The instruction completion unit 254 typically determines whether a flush is necessary or if a cache miss has occurred and thus, can be provided with additional logic to provide an output signal to the elements 430, 470, and/or 490, to indicate a reset of these elements when such an event has occurred.

FIGS. 5A-5C are example diagrams illustrating cycle-by-cycle operations of the circuitry of FIG. 4 in accordance with one illustrative embodiment. FIG. 5A is a simplified example in which only a single instruction is flowing through the IFU pipeline. The diagram shows each stage ifm1 to if2 of the IFU pipeline along with the progression, by processor cycle, of an instruction A. The diagram further shows the value of the if2 write pointer (ptr) for each processor cycle.

As shown in FIG. 5A, at the ifm1 stage at cycle 0 the instruction A is allocated an instruction fetch address register and the pointer is pointing to history register 0. Since there is an access at the ifm1 stage, the pointer is incremented by the incrementer 420 to point to history register 5 (assuming n=6 in this case). The instruction A then flows through instruction fetch unit stage if0, if1, and if2 with the pointer value remaining pointing at history register 5. At stage if2, an allocation is performed and the decrementer 410 decrements the pointer ptr to point to history register 0 again.

It can be seen from this example that, for a single instruction, history register 5 was written to indicate that the instruction buffer had room during this access. It is easy to see that if this were done 6 times in a row, the history information for 6 accesses prior may be maintained in the history registers.

FIG. 5B shows a similar example but this time with two instructions in the pipeline that are one processor cycle apart. It can be seen that in cycle 2 when instruction B enters the pipeline, the pointer value ptr is again incremented to point to history register 4 now. As a result, the history value corresponding to instruction A will be written to history register 4 which is then followed by the decrementer 410 decrementing the pointer to point to history register 5 where the history value for instruction B is later written. Thus, in this case, in cycle 3, the next to oldest history value is written to hist4 with a subsequent write of the oldest history value to the hist5 register.

FIG. 5C illustrates a more complicated example in which there are a large number of consecutive accesses. As with the previous examples, as new accesses occur, the incrementer 420 increments the pointer ptr to point to a next younger history register and when the instruction allocation occurs in stage if2, the decrementer 410 decrements the pointer ptr value to point to a next older history register. In the particular example shown in FIG. 5C, the history registers 1 and 2 are not written to based on the ptr value but instead store values based on the shifting of values left from history register to history register. This has to do with the depth of the pipeline versus the number of history entries that are stored. Thus, some of the multiplexers shown in FIG. 5C may actually be eliminated.

It should be noted that the diagrams in FIGS. 5A-5C are provided to explain how the decrementer 410 and incrementer 420 operate to adjust the if2 write pointer ptr to point to different ones of the history registers. In addition to this operation, as described above, values in the history registers are shifted left with each ifm1 allocation such that the value in history register 5 is shifted to history register 4, which is then shifted to history register 3, etc. with the history register 0 always storing the history value for the nth access in the past, e.g., the $6^{th}$ access in the past.

Figure 6:
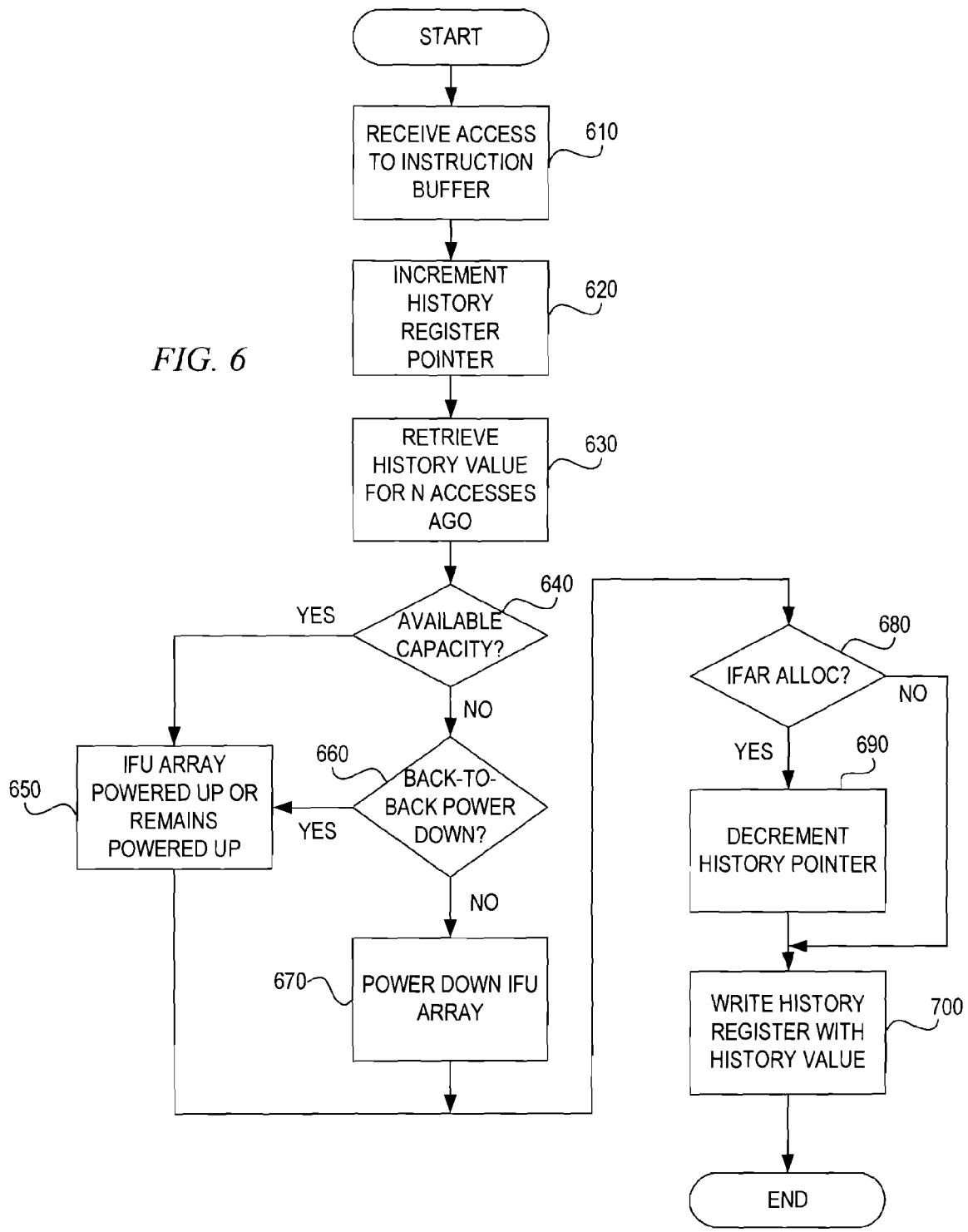
FIG. 6 is a flowchart outlining an example operation for performing a power up/down operation based on instruction buffer capacity history information in accordance with one illustrative embodiment.

FIG. 6 is a flowchart outlining an example operation for performing a power up/down operation based on instruction buffer capacity history information in accordance with one illustrative embodiment. The operation outlined in FIG. 6 may be implemented, for example, in circuitry of an instruction fetch unit of a processor, for example. Moreover, the operation outlined in FIG. 6 may be replicated and performed in parallel for a plurality of different threads supported by the architecture of the processor. In one illustrative embodiment, the operation outlined in FIG. 6 may be performed using the circuitry provided in FIG. 3 above. It should be noted, however, that the present invention is not limited to the particular circuit arrangement shown in FIG. 3 and thus, any other type of circuitry capable of implementing the operation shown in FIG. 6 may be used without departing from the spirit and scope of the illustrative embodiments.

As shown in FIG. 6, the operation starts with receiving an access to the instruction buffer in the IFU (step 610). A history register pointer is incremented (step 620) and a history value for n accesses ago is retrieved (step 630). A determination is made as to whether the history value indicates that the instruction buffer had available capacity n accesses ago (step 640). If so, then the IFU array is powered up or remains powered up (step 650). If the instruction buffer did not have available capacity n accesses ago, a determination is made as to whether a last access also resulted in a power down operation (step 660). If not, then the IFU arrays are powered down (step 670). Otherwise, if a last access did result in a power down operation, then the IFU arrays are powered up (step 650).

A determination is made as to whether the access results in an instruction fetch address register being allocated in the instruction buffer (step 680). If so, then the history register pointer is decremented (step 690). Thereafter, or if the instruction fetch address register is not allocated, an appropriate history register corresponding to the history register pointer is written with the value indicative of whether the instruction buffer has available capacity or not (step 700). The operation then terminates. This operation may be repeated for each access received by the IFU.

It should again be noted that while the illustrative embodiments are described in terms of looking back to a capacity level of an instruction buffer n accesses prior to a current access to determine whether to power on/off IFU arrays, the illustrative embodiments are not limited to such. To the contrary, other illustrative embodiments may look at any predetermined pattern of capacity state of the instruction buffer for accesses prior to a current access to infer information about the likelihood that the instruction buffer will have available capacity for the fetching of the group of instructions for the current access. The key concept being that a pattern of behavior of the instruction buffer may be determined and used as a basis for predicting the availability of the instruction buffer for storing the instructions of a current access.

Thus, the illustrative embodiments provide mechanisms for saving power by powering down IFU arrays based on the observation that there is often a pattern where the instruction buffer is full every so many cycles. The illustrative embodiments allow such power savings to be achieved without loss of processor performance. Additionally, the mechanisms of the illustrative embodiments operate to meter the instruction fetching sot that power savings is made possible even in the case where the consumption rate of the instruction buffers is slower than the ability of the instruction fetch unit to fetch instructions.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor, for powering down an instruction fetch unit array, comprising:
    receiving, in the processor, a current access to an instruction buffer of the processor, wherein the current access is a fetch of a group of one or more instructions to be stored in the instruction buffer;
    determining, by the processor, for one or more prior accesses occurring prior to the current access, if a predetermined pattern of capacity availability of the instruction buffer indicates that the instruction buffer is likely to have available capacity to store the group of one or more instructions of the current access; and
    powering down an instruction fetch unit array in response to a determination that the instruction buffer is not likely to have available capacity to store the group of one or more instructions of the current access.

2. The method of claim 1, wherein determining if the predetermined pattern of capacity availability of the instruction buffer indicates that the instruction buffer is likely to have available capacity to store the group of one or more instructions of the current access comprises:
    determining if the instruction buffer had available capacity a predetermined number of prior accesses prior to the current access to store a corresponding group of one or more instructions in the instruction buffer, and
    wherein the instruction fetch unit array is powered down in response to a determination that the instruction buffer did not have available capacity to store the corresponding group of one or more instructions in the instruction buffer the predetermined number of prior accesses prior to the current access.

3. The method of claim 1, wherein the instruction fetch unit array is one of an instruction cache, a branch history table, or a count cache.

4. The method of claim 1, further comprising:
    determining if a predetermined number of consecutive power down operations have occurred prior to the current access; and
    in response to the predetermined number of consecutive power down operations having occurred prior to the current access, powering up the instruction fetch unit array.

5. The method of claim 1, further comprising:
    determining, for each prior access to the instruction buffer, whether or not the instruction buffer has available capacity to store one or more instructions corresponding to the prior access;
    storing, for each prior access to the instruction buffer, a history value in a history register, of a plurality of history registers, indicating whether the instruction buffer had available capacity to store the one or more instructions corresponding to the prior access; and utilizing the history values stored in the plurality of history registers to determine if a predetermined pattern of capacity availability of the instruction buffer indicates that the instruction buffer is likely to have available capacity to store the group of one or more instructions of the current access.

6. The method of claim 5, further comprising:
clearing history values stored in the plurality of history registers in response to one of one or more predetermined events being detected to occur.

7. The method of claim 6, wherein the one or more predetermined events include a flush of an instruction pipeline and an instruction cache miss.

8. The method of claim 5, further comprising:
incrementing or decrementing, for each prior access to the instruction buffer, a write pointer in a write pointer register, wherein the write pointer identifies a history register in the plurality of history register to write to; and
storing a history value for the current access to a history register identified by the write pointer.

9. The method of claim 8, wherein the write pointer is decremented in response to the instruction buffer having available capacity to store the one or more instructions corresponding to the prior access, and wherein the write pointer is incremented in response to an allocation at an instruction fetch minus 1 stage.

10. The method of claim 8, wherein an output of the write pointer register is input to a decoder, and wherein the decoder outputs a select signal to a plurality of first multiplexers associated with the plurality of history register to select between an input indicating whether there is available capacity in the instruction buffer or not for the current access or a feedback input from a corresponding history register.

11. The method of claim 8, further comprising:
providing outputs from the plurality of first multiplexers to a plurality of second multiplexers that are configured to perform a shift left operation on values stored in the plurality of history registers in response to an allocation being performed in an instruction fetch minus 1 stage.

12. The method of claim 8, further comprising:
storing in a last access register a value indicating whether the instruction fetch unit array was powered down in response to a last access to the instruction buffer; and
determining whether or not to power down the instruction fetch unit array based on the value stored in the last access register.

13. An apparatus, comprising:
an instruction fetch unit; and
an instruction fetch unit array coupled to the instruction fetch unit, wherein the instruction fetch unit comprises:
an instruction buffer;
instruction buffer history storage logic coupled to the instruction buffer; and
power up/down logic coupled to the instruction buffer and instruction buffer history storage logic, wherein:
the instruction fetch unit receives a current access to an instruction buffer of the processor, wherein the current access is a fetch of a group of one or more instructions to be stored in the instruction buffer;
the power up/down logic determines, for one or more prior accesses occurring prior to the current access, based on history information stored in the instruction buffer history storage logic, if a predetermined pattern of capacity availability of the instruction buffer indicates that the instruction buffer is likely to have available capacity to store the group of one or more instructions of the current access, and
the power up/down logic powers down the instruction fetch unit array in response to a determination that the instruction buffer is not likely to have available capacity to store the group of one or more instructions of the current access.

14. The apparatus of claim 13, wherein:
the power up/down logic determines if the predetermined pattern of capacity availability of the instruction buffer indicates that the instruction buffer is likely to have available capacity to store the group of one or more instructions of the current access by determining if the instruction buffer had available capacity a predetermined number of prior accesses prior to the current access to store a corresponding group of one or more instructions in the instruction buffer, and
the power up/down logic powers down the instruction fetch unit array in response to a determination that the instruction buffer did not have available capacity to store the corresponding group of one or more instructions in the instruction buffer the predetermined number of prior accesses prior to the current access.

15. The apparatus of claim 13, wherein the instruction fetch unit array is one of an instruction cache, a branch history table, or a count cache.

16. The apparatus of claim 13, further comprising:
consecutive power down logic coupled to the power up/down logic, wherein the consecutive power down logic determines if a predetermined number of consecutive power down operations have occurred prior to the current access, and, in response to the predetermined number of consecutive power down operations having occurred prior to the current access, causes the power up/down logic to power up the instruction fetch unit array.

17. The apparatus of claim 13, wherein the instruction buffer history storage logic is configured to:
determine, for each prior access to the instruction buffer, whether or not the instruction buffer has available capacity to store one or more instructions corresponding to the prior access; and
store, for each prior access to the instruction buffer, a history value in a history register, of a plurality of history registers, indicating whether the instruction buffer had available capacity to store the one or more instructions corresponding to the prior access, and wherein the history values stored in the plurality of history registers are utilized by the power up/down logic to determine if a predetermined pattern of capacity availability of the instruction buffer indicates that the instruction buffer is likely to have available capacity to store the group of one or more instructions of the current access.

18. The apparatus of claim 17, further comprising:
history clearing logic coupled to the instruction buffer history storage logic, wherein the history clearing logic clears history values stored in the plurality of history registers in response to one of one or more predetermined events being detected to occur.

19. The apparatus of claim 18, wherein the one or more predetermined events include a flush of an instruction pipeline and an instruction cache miss.

20. The apparatus of claim 17, wherein the instruction buffer history storage logic comprises a write pointer register coupled to an incrementer and a decrementer, and wherein an incrementer and decrementer together operate to increment/ decrement a write pointer in the write pointer register in response to each prior access to the instruction buffer, the write pointer identifying a history register in the instruction buffer history storage logic to which to write a history value for the current access.

21. The apparatus of claim 20, wherein the write pointer is decremented by the decrementer in response to the instruction buffer having available capacity to store the one or more instructions corresponding to the prior access, and wherein the write pointer is incremented by the incrementer in response to an allocation at an instruction fetch minus 1 stage.

22. The apparatus of claim 20, further comprising:
a decoder coupled to the write pointer register; and
a plurality of first multiplexers coupled to the decoder, wherein an output of the write pointer register is input to a decoder, and wherein the decoder outputs a select signal to the plurality of first multiplexers associated with the plurality of history register to select between an input indicating whether there is available capacity in the instruction buffer or not for the current access or a feedback input from a corresponding history register.

23. The apparatus of claim 20, further comprising:
a plurality of second multiplexers coupled to the plurality of first multiplexers, wherein outputs from the plurality of first multiplexers are output to a plurality of second multiplexers that are configured to perform a shift left operation on values stored in the plurality of history registers in response to an allocation being performed in an instruction fetch minus 1 stage.

24. The apparatus of claim 20, further comprising:
a last access register coupled to the plurality of second multiplexers, wherein the last access register stores a value indicating whether the instruction fetch unit array was powered down in response to a last access to the instruction buffer, and wherein the power up/down logic determines whether or not to power down the instruction fetch unit array based on the value stored in the last access register.

* * * * *